United States Patent [19]

Ecer

[11] Patent Number: 4,673,549
[45] Date of Patent: Jun. 16, 1987

[54] METHOD FOR PREPARING FULLY DENSE, NEAR-NET-SHAPED OBJECTS BY POWDER METALLURGY

[76] Inventor: Gunes Ecer, 123 Honeycomb Ct., Encinitas, Calif. 92024

[21] Appl. No.: 836,978

[22] Filed: Mar. 6, 1986

[51] Int. Cl.$^4$ .............................................. B22F 7/00
[52] U.S. Cl. ........................................ 419/10; 419/48; 419/49; 419/51; 264/125; 264/DIG. 36
[58] Field of Search ....................... 419/10, 48, 49, 51; 264/125, DIG. 36

[56] References Cited

U.S. PATENT DOCUMENTS

| | | | |
|---|---|---|---|
| 3,284,195 | 11/1966 | Googin et al. | 419/49 |
| 3,356,496 | 12/1967 | Hailey | 75/226 |
| 3,689,259 | 9/1972 | Hailey | 175/226 |
| 4,339,271 | 7/1982 | Isaksson et al. | 75/223 |
| 4,359,336 | 11/1982 | Bowles | 75/226 |
| 4,379,725 | 4/1983 | Kemp | 148/4 |
| 4,428,906 | 1/1984 | Rozmus | 419/48 |
| 4,499,048 | 2/1985 | Hanejko | 419/49 |
| 4,499,049 | 2/1985 | Hanejko | 419/49 |
| 4,539,175 | 9/1985 | Lichti et al. | 419/49 |

OTHER PUBLICATIONS

"Hot Isostatic Pressing of Metal Powders", by Peter E. Price et al., *Metals Handbook*, vol. 7, 1986, 9th Ed., Am. Soc. of Metals, pp. 419–443.
"Stamp Process", by B. Lynn Ferguson, *Metals Handbook*, vol. 7, 1984, (9th Ed., Am. Soc. of Metals, pp. 547–550.
"Emerging Alternatives to Hot Isostatic Pressing", by B. Lynn Ferguson, *The International Journal of Powder Metallurgy & Powder Technology*, vol. 21, No. 3, 1985, Am. Powder Metallurgy Institute, pp. 201–218.

Primary Examiner—Stephen J. Lechert, Jr.
Attorney, Agent, or Firm—Klein & Szekeres

[57] ABSTRACT

A method of manufacture of objects by consolidation of powdered metals, alloys, ceramics, or their mixtures is disclosed. The method comprises the steps of preparing a shaped, preferably ceramic, shell, placing it inside a metal or ceramic can, filling both the shell and space between the shell and the can with powder, outgassing and sealing the can if necessary, heating the full can and pressing it to consolidate the powder into a dense form; and separating the densified object within the shell from the densified shapes between the shell and the can. During pressing, the ceramic shell does not consolidate or bond to the surrounding powder, thus acting as an easy parting surface as well as being a shape defining container for the object being consolidated. The method permits easy definition of desired shell shape and permits manufacture of complex shaped, fully densified objects in near-net-shape form.

26 Claims, 6 Drawing Figures

METHOD FOR PREPARING FULLY DENSE, NEAR-NET-SHAPED OBJECTS BY POWDER METALLURGY

BACKGROUND OF THE INVENTION

1. Field of the Invention

The present invention is directed to a process of forming consolidated fully dense, near-net-shaped metal parts or objects by powder a metallurgy. More specifically, the present invention is directed to a powder metallurgy process which is capable of consolidating powders to form complex-shaped parts or objects within a straight walled metallic die with pressure supplied by a simple press.

2. Brief Description of the Prior Art

Near-net-shaped metal parts or objects may be produced by several processes, such as casting, forging, extrusion, cold or warm forming, and powder metallurgy. Certain types of objects or parts can be made only by one of the above-noted processes. The capabilities of the several near-net-shape processes overlap to a certain extent and therefore most parts or objects can be manufactured by more than one process. For this reason, in many cases a particular near-net-shape manufacturing process is selected for a certain part as a result of economic considerations, or because the selected process provides the more desirable mechanical and/or metallurgical properties in the finished part.

Powder metallurgy processes have relatively low requirements for energy and a high degree of material utilization, relatively short processing cycle time, and relatively low machining requirements. Primarily for these reasons, powder metallurgy (P/M) has been making advances into the markets served by other, more traditional, near-net-shape technologies, such as casting and forging. Moreover, relatively recently developed powder metallurgy techniques are capable of producing fully dense, chemically homogeneous, fine microstructured metal or ceramic parts, which may have superior overall qualities, at a lower manufacturing cost, than comparable more conventionally manufactured parts.

The most frequently used powder metallurgy process for making full density near-net-shaped parts is Hot Isostatic Pressing (HIPping). As is well known in the art, in the HIPping process, a powder part or compacted powder is subjected, at elevated temperatures, to equal pressure from every side, the pressure being transmitted by a pressurizing inert gas, usually argon. Typical conditions of the HIPping process range from 3 to 45 ksi (20 to 300 MPa) pressure (approximately 15 ksi, 100 MPa being average), and 895° F. (480° C.) to 3090° F. (1700° C.) temperature. The temperature, of course, depends greatly on the nature of the metal alloy which is being consolidated in the process. A review of the state-of-the-art of HIP processing, as applied to metal powders, is given by Peter E. Price and Steven P. Kohler in *Metals Handbook*, 9th Ed., Vol. 7, Hot Isostatic Pressing of Metal Powders, ASM, Metals Park, Ohio, pp. 419–443. U.S. Pat. Nos. 4,339,271, 4,359,336, and 4,379,725 describe, for example, processes relating to or comprising improvements of the above-summarized basic HIPping process.

The high cost of the pressure vessels and other equipment which is required for HIPping, canning of the compact before pressurization (to prevent oxidation and gaseous penetration of the consolidated product), the relatively long cycle time, and other factors make HIPping, overall, a costly process. Because of these and other disadvantages associated with HIPping, several alternatives to the HIPping process emerged during the recent years. Three of these alternatives, the so-called CERACON process, Rapid Omnidirectional Compaction (ROC), and the STAMP process are described by Lynn Ferguson in an article titled "Emerging Alternatives to Hot Isostatic Pressing", *International Journal of Powder Metallurgy and Powder Technology*, Vol. 21(3), 1985.

Each of the above-noted alternatives to HIPping "attempts to approximate the isostatic pressure conditions of HIP during consolidation of powder metal parts, while using conventional pressing equipment". Thus, in these alternatives the pressurizing gas in the HIP vessel is substituted for by a secondary pressing medium, which is typically ceramic material or carbon. In these alternative processes, the advancing top punch of a conventional press pressurizes the secondary pressure medium which transfers pressure to the workpiece. The result is consolidation of the workpiece under nearly isostatic conditions.

The STAMP process (one of the above-noted alternatives to HIP), for example, is used to produce billets and semifinished workpieces which are subsequently hot worked to shape. More particularly, in the STAMP process a conventional press is used to consolidate a powder mass contained in a can. The pressure of the press is transmitted through a secondary medium. The STAMP process is described in more detail, for example, in "Stamp Process", *Metals Handbook*, 9th Ed., Am. Soc. of Metals, Metals Park, Ohio, Vol. 7, pp. 547–550, 1984.

The STAMP process is not intended or capable of producing net-shaped or nearly net-shaped products. A probable reason for this lies in the fact that, under pressure, plastic deformation of the compacting powder body of the manufactured object occurs at rates and directions which is defined by the elastic/plastic deformation of the surrounding medium. The compressibility ratios of the powder of the object and of the medium are not equal. Therefore, after pressing under a given set of pressure and temperature conditions, the achieved final densities (expressed as percentage of theoretical density) of the two materials are not equal. In light of this, it will be readily understood that if, for example, during pressing in the STAMP process full density is achieved in the powder mass of the manufactured part but not in the pressurizing medium, then the fully densified part being incompressible (its density can no longer be increased) continues to deform in the direction of the weaker and perhaps more openly packed pressurizing medium. This, of course, leads to distortion of the manufactured part. Frictional differences between the powder of the manufactured part and the surrounding medium also have a distorting effect in the STAMP and like processes, probably for reasons which are similar to the reasoning elucidated regarding compressibility differences.

A net result of the foregoing and related effects is that in the STAMP and like processes of the prior art (which substitute a non-gaseous secondary medium for the pressurizing gas of HIP) variations in the several processing parameters affect the final shape of the consolidated part so that it is very difficult to hold close tolerances. (The processing parameters which affect the shape of the final part include pressure, temperature, temperature distribution, powder particle shape and distribution, and particle surface chemistry.)

Initial versions of the Ceracon process (another of the three prior art alternatives to HIPping), as disclosed in U.S. Pat. Nos. 3,356,496 and 3,689,259, were difficult to practice in terms of keeping dimensional control over the manufactured part. These processes were also too cumbersome. Improvements over the basic Ceracon process, such as, for example, the ones described in U.S. Pat. Nos. 4,499,048, 4,499,049, and 4,539,175, specify spherical ceramic particles, carbon, or their mixtures for the pressurizing medium in order to reduce interparticle friction. These patents do not address the need for uniform compressibility to achieve dimensional control so that when compressed powder compacts are pressed within the ceramic or carbon medium, final dimensions differ in all directions, most often unpredictably.

Another near net shape processing technique which is related to powder metallurgy is "powder forging". Powder forging involves the steps of (1) cold compaction of the metal powder; (2) sintering the compact; (3) heating the compact, and (4) forging the compact in a closed die typically maintained at approximately 600° F. temperature. Although powder forging is a low cost, high "through-put" process, it is limited to manufacturing part shapes which can be made in a closed die. Powder forging also has the disadvantage of likely cracking in places where thick and thin sections are forged together.

None of the presently known powder metallurgy processes considered the importance of relative compressibility of the pressurizing medium and of the powder of the manufactured part. In other words, none of these processes, known to the present inventor, realized, in terms of the dimensions of the manufactured part, the importance of the phenomenon that, under pressure, compactions of the secondary pressure medium and of the powder of the part proceed at different rates. This, in the opinion of the present inventor, is one of the important reasons why the prior art powder metallurgy processes involving a secondary medium other than pressurized gas, fail to provide sufficient dimensional control of the manufactured part and therefore require excess machining stock on the surface to meet dimensional requirements.

The present invention provides a significant improvement over the prior art powder metallurgy processes in terms of dimensional control of the manufactured part and therefore in overall cost.

SUMMARY OF THE INVENTION

It is an object of the present invention to provide a powder metallurgy process involving the use of a conventional press, rather than highly pressurized gas, to produce objects or parts of near-net-shape dimensions.

It is another object of the present invention to provide a powder metallurgy process for producing objects or parts of near-net-shape dimensions, in which compressibility related shrinkage problems are substantially eliminated, and where the dimensions shrink predictably in the direction of pressure applied by a punch or the like, and remain substantially unaltered in the direction perpendicular to the applied pressure.

It is still another object of the present invention to provide a powder metallurgy process for producing objects or parts of near-net-shape dimensions, which process is relatively inexpensive to practice and suited for the manufacture of complex part shapes.

The foregoing and other objects and advantages are attained by a process wherein a "shell" or a shaped container is made of ceramic, carbon, or metallic particles or fibers, and wherein the shell is placed inside another metal or ceramic can, which is itself shaped to fit a metal die cavity where the pressurization will take place. The can and the ceramic shell is heated to dry out volatile elements, although this step may not be necessary if both the shell and the can are metals and there are no volatile elements present.

Subsequently the cavity of the shell is filled with the powder which is to be consolidated into the manufactured object or part. The space between the shell and the can is filled either by the same powder, or another powder having substantially the same compressibility ratio as the compressibility ratio of the powder of the manufactured part. Compressibility ratio, in this respect, is defined as the ratio of the density of the powder after consolidation to the apparent density prior to consolidation.

After filling the shell and also the space between the shell and the can with the respective powders, the powders are degassed, if necessary, and the can is sealed by welding or by some other suitable means known in the art. The assembly is then heated to the desired consolidation temperature, and placed in the die cavity where it is rapidly pressed or forged.

After cooling, the consolidated metal or ceramic object contained within the shell is readily separated from the material between the shell and the can, because the material of the shell is specifically selected not to fully consolidate or to bond to the surrounding powder. In some cases, additional parting surfaces may be placed within the space between the shell and the can prior to filling the space with powder, to further facilitate separation of the consolidated product. In alternative embodiments of the process of the invention, the die cavity may serve as a can, thereby eliminating the need for a separate can.

A significant advantage and important feature of the invention is that there is only minimal movement and compaction in the powders in the direction perpendicular to the applied pressure. In the direction of the pressure the compaction is predictably based on the known compressibility of the powder to be consolidated, which is identical or substantially identical with the compressibility of the powder filling the surrounding space.

Thus, in accordance with the present invention there is no intent to achieve nearly isostatic conditions during consolidation. The intent is to achieve consolidation through unidirectional application of the pressure with the expectation that the powder body of the object to be consolidated shrinks only in the direction of the applied pressure, and that the dimensions perpendicular to the direction of the pressure remain substantially unaltered after consolidation.

The features of the present invention can be best understood, together with further objects and advantages, by reference to the following description, taken in connection with the accompanying drawings.

DESCRIPTION OF THE PREFERRED EMBODIMENT

The following specification, taken in conjunction with the drawings, sets forth the preferred embodiments of the present invention. The embodiments of the invention disclosed herein are the best modes contemplated by the inventor for carrying out his invention in a commercial environment, although it is understood that several modifications can be accomplished within the scope of the present invention.

Figure 1:
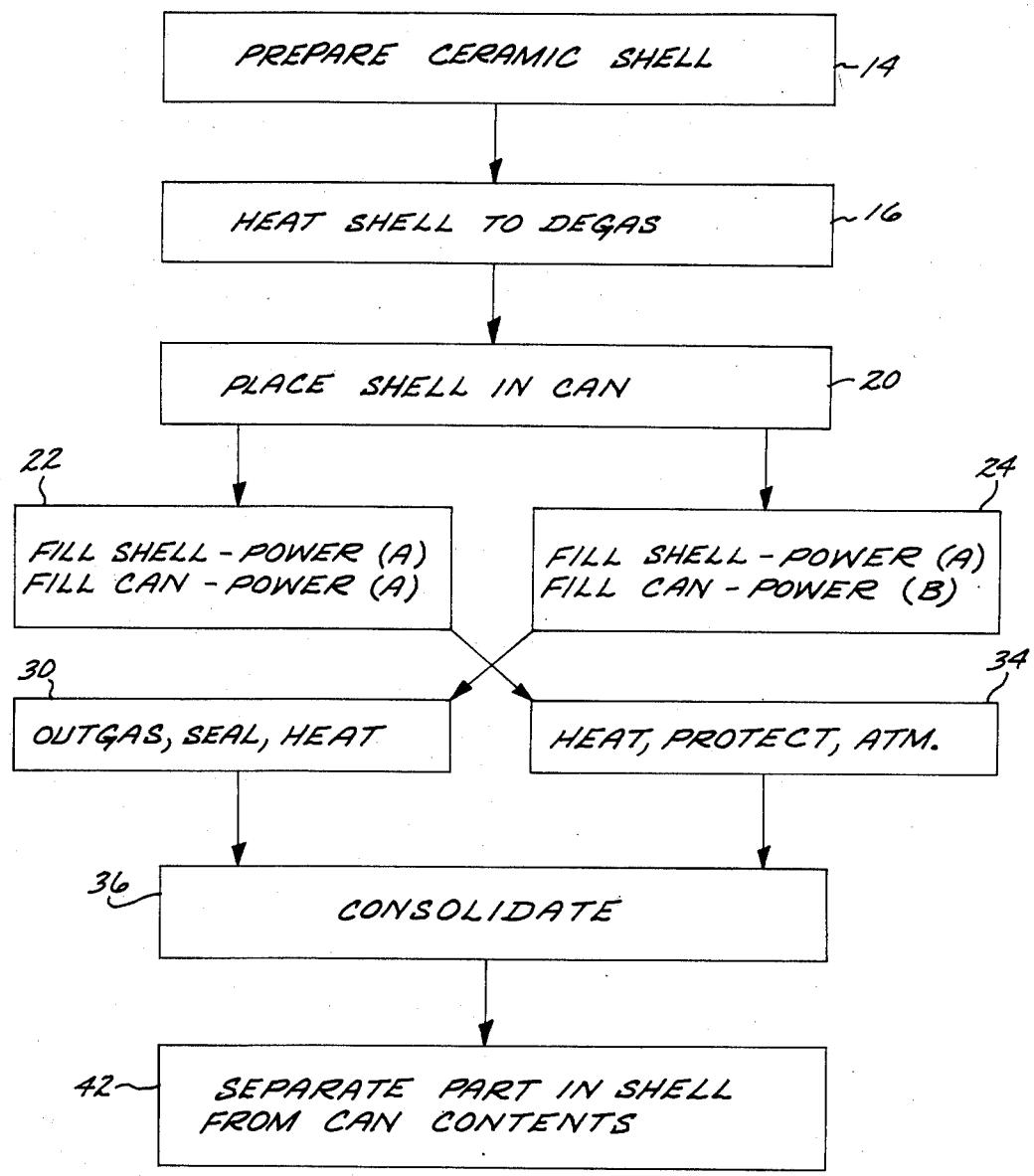
FIG. 1 is a flow diagram showing the steps of the process of the present invention.
Figure 2:
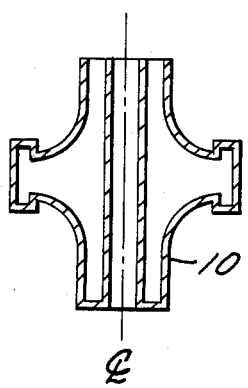
FIG. 2 is a cross-sectional view showing an empty shell container used in the process of the present invention.

FIG. 1 of the appended drawings is a flow diagram which schematically illustrates the steps of the process of the present invention. As a first step of the process of the present invention, a shell is prepared to provide a cavity in the shape of the object which is to be consolidated (prepared) in the process. FIG. 2 shows an example of a shell 10 which is adapted for the preparation of an object or part 12 shown on FIG. 5.

In accordance with the present invention, lateral dimensions of the cavity of the shell 10 are substantially the same as the corresponding dimensions of the consolidated object 12. "Lateral" is defined in this respect as the direction perpendicular to the direction in which pressure is applied to the shell 10 in a subsequent step of the process of the present invention. Vertical dimensions of the cavity of the shell 10 can be calculated by multiplying the corresponding dimensions of the consolidated product 12 with the compressibility ratio ($\gamma$) of the powder which is consolidated in the process. "Vertical" in this respect is defined as the direction in which pressure is applied to the shell 10 in a subsequent step of the process of the present invention.

The compressibility ratio ($\gamma$) for products which, in their final consolidated forms are fully dense, is defined as the ratio of the full density of the product to the apparent density of the powder to be consolidated. The apparent density of the powder is defined as weight of a unit volume of powder; apparent density is usually expressed in grams per cubic centimeter. The compressibility ratio ($\gamma$) can be more specifically defined by the equation $$(\gamma) = \frac{\text{density of object after consolidation}}{\text{apparent density of powder}}$$

Thus, in accordance with the present invention, the vertical dimensions of the cavity of the shell 10 take into consideration the fact that, during a subsequent step of consolidation, there is a predictable and relatively accurately calculable shrinkage of the vertical dimensions of the product 12.

The shell 10 is preferably ceramic and may be prepared in accordance with a variety of conventional techniques known in the art. The shell 10 may, for example, be prepared in accordance with the lost wax process where a wax pattern of the intended shell cavity is coated repeatedly with slurries of ceramic particles, dried, and thereafter the wax melted away leaving behind the appropriately shaped ceramic shell 10. As further examples, the shell 10 may also be prepared by casting of ceramic slurries, or by pressing ceramic fibers (not shown) to shape. The shell 10 can also be made from powders of metals, metalloids, carbons, or from the mixtures of the foregoing materials. Still further, a ceramic shell 10 may be made from fibrous or woven refractory material. The wall of the shell 10 is kept relatively thin, preferably 1/16" to ⅛".

A criterion for the selection of the material of the shell 10, however, is that in the subsequent step of consolidation, the shell 10 must not consolidate with the powder contained in the shell 10.

In the event the shell 10 is produced by a wet technique, such as a technique involving the use of slurries, then volatile materials and "fugitive" chemicals and combustibles must be removed by heating and degassing. This may, typically, be done by heating the shell to temperatures of 1500° to 2000° F. (815° to 1100° C.). In the flow chart of FIG. 1 the step of preparing the shell is illustrated by box 14, and the step of drying and degassing is illustrated by box 16.

The shell 10 may have a layer of a solid lubricant or carbon applied to its interior. As it will be seen in the process steps described below, the lubricant may help separation of the consolidated object or part 12. Carbon, on the other hand, may act as a carburizing agent to carburize the exterior of the consolidated part 12. As still another alternative, the interior of the ceramic shell may have a "green" coating of a material which, upon consolidation, becomes an integral part of the consolidated component as a coating. During the process of fabricating the ceramic shell 10, it may be built up around a cold pressed and/or sintered powder metallurgy (P/M) preform rather than on a wax pattern.

After the step of degassing, the shell 10 is placed into a can 18 in a step which is schematically shown in the flow chart of FIG. 1 in box 20. The can 18 is made in the shape of the die cavity in which consolidation will take place. The can 18 may be made of ceramic, clay, or metal. If the can 18 is ceramic, it may be produced simultaneously with the production of the shell 10. Depending on the particular shape of the shell 10 and can 18, and the size of the consolidating equipment (press punch), several shells 10 may be placed into the can 18.

Figure 3:
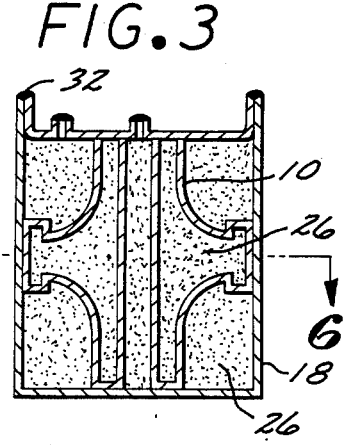
FIG. 3 is a cross-sectional view showing a stage in the process of the present invention, wherein the shell has been placed into a metal container, filled with suitable powder, the powders have been outgassed and the shell has been sealed by welding.

In the subsequent step of the process of the present invention, schematically shown in boxes 22 and 24 in the flow chart of FIG. 1, the shell 10 and the can 18 are filled with powder, making sure that the powder fills all available space. More particularly, the shell 10 is filled with the powder 26 to be consolidated, whereas the space between the can 18 and the shell 10 is filled either with the same powder 26, as shown in box 22, or with a powder 28 that has substantially the same compressibility ratio as the powder 26. The latter step is shown schematically in the box 24 of FIG. 1. Preferred is the step in the process of the present invention when the powders filling the shell 10 and the space between the shell 10 and the can 18 are the same. A can 18 and a shell 10 filled with the powder 26 in accordance with the present invention are shown in cross-section on FIG. 3.

The powder 26 is of the type well known in powder metallurgy for making consolidated objects, and as such, may be a metal alloy, ceramic, or cermet. Detailed description of suitable powders for the making of fully dense consolidated objects by powder metallurgy is not considered necessary here, because these are well known in the art. Moreover, it will be readily recognized by those skilled in the art that the nature of the powder is dependent on the desired properties of the consolidated object 12. The powder compositions described in U.S. Pat. Nos. 3,356,496; 3,689,259; 4,499,048; and 4,499,049, as suitable for producing the processes described in those patents, can also be used, for example, in the process of the present invention. The specifications of these U.S. patents are expressly incorporated herein by reference.

In connection with the relative nature of the powder 26 to be consolidated and the ceramic shell 10, it is noted again that the ceramic shell composition is optimally selected to suit the metal alloy being consolidated to assure minimal thermally activated reactions between the shell and the metal alloy. The composition of the shell 10 and the powder 26 may also be selected to produce a desired reaction between the two; for example, a carbon containing shell may lead to carburization. Similarly, nitriding or boronizing of the outer surface of the consolidated object may also be accomplished by appropriate selection of the shell material, or of an inner coating therein.

The can 18 may be of the type known in the art in powder metallurgy processes, and may be made of metal, refractory oxide, or carbon, or even of minerals like clay.

After the step of filling with the powder 26, or powders 26 and 28, the can 18 is covered, outgassed with a vacuum pump, and thereafter is sealed by welding. These steps are schematically shown on FIG. 1 in box 30. As it will be readily understood by those skilled in the art, the step of outgassing is usually necessary in order to avoid oxidation or contamination of powders having reactive elements, such as superalloys. For most alloys and ceramics, however, the step of outgassing may be avoided. Welds 32 sealing the outgassed can 18 are schematically shown on FIGS. 3 and 4.

After the can 18 is sealed, or if outgassing is not necessary, then, possibly without sealing, the can 18 and its contents are heated to the temperature of consolidation. When the can 18 is not sealed because outgassing was not necessary, then the heating is best conducted under a protective atmosphere, as is schematically shown in box 34 of FIG. 1. In this regard, it is noted that boxes 30 and 34 on FIG. 1 show two alternative process steps. Thus, in summary, the heating to consolidation temperature is best conducted either together with the outgassing, or simply under a protective atmosphere.

The step of heating is conducted in such a manner that the temperature of the can assembly uniformly reaches the desired forging temperature. The range of this temperature, as is well understood by those skilled in the art, depends on several factors, primarily on the nature of the powder 26 which is to be consolidated. By way of example, 1900° F. (1038° C.) is a typical temperature to which the can assembly is heated prior to the subsequent step of pressing or forging of a steel powder.

Figure 4:
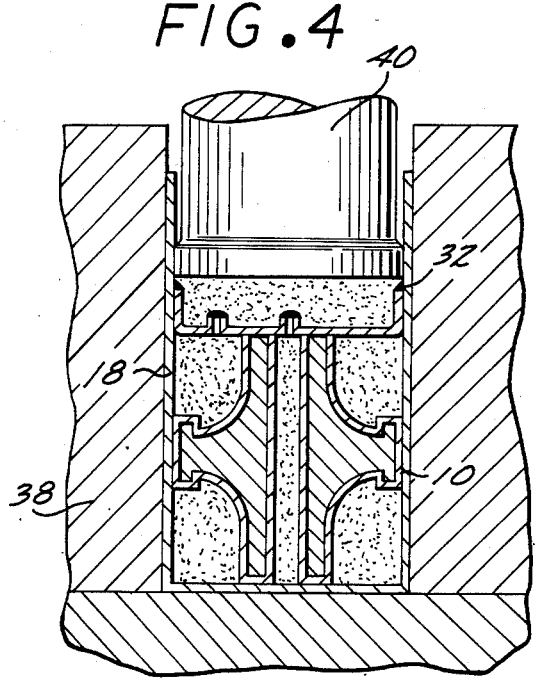
FIG. 4 is a cross-sectional view showing consolidation of the powder into the desired object, while the shell in the can is subjected to pressure in a hard die via a top punch.

In the next step of the process of the present invention, schematically shown in box 36 of FIG. 1, the can assembly is placed into a hard die cavity 38, shown on FIG. 4, and pressed by the action of a press punch 40.

The pressing is conducted for the time necessary to consolidate the object 12. In this regard, the pressing is preferably conducted in a rapid manner to provide consolidation rates higher than 20" per minute, and more preferably consolidation rates higher than 100" per minute. Such relatively high consolidation rates produce frictional heat between powder particles, and break-up and mix powder surface films, and therefore provide completely or substantially completely exposed clean powder surfaces for complete metallurgical bonding of the particles.

During the consolidation step, the pressing can also be done from two directions simultaneously. Alternatively, instead of using a press punch, the heated preform assembly may be impact forged using a hammer (not shown) and a cavity die (not shown). In the event the can 18 contains several shells 10, then, of course, several objects 12 are consolidated simultaneously in the same pressing step.

Typically, and by way of example rather than limitation, pressures of 40 to 60 ksi (276 to 414 MPa) are used in the pressing step for carbon and low alloy steels, and the pressure is maintained typically for a second or so, so that the entire step of consolidation is typically a matter of several seconds.

After consolidation, the can assembly is disassembled symbolized by the process step in box 42 in FIG. 1. In this step, the consolidated object 12 is obtained separately from the consolidated surrounding pieces (not shown), which are obtained from the powder 26 or 28 that, before consolidation, has filled the spaces between the shell 10 and the can 18. The surrounding pieces (not shown) are actually separated from the consolidated object 12 by the compressed, but not bonded, shell material.

Figure 6:
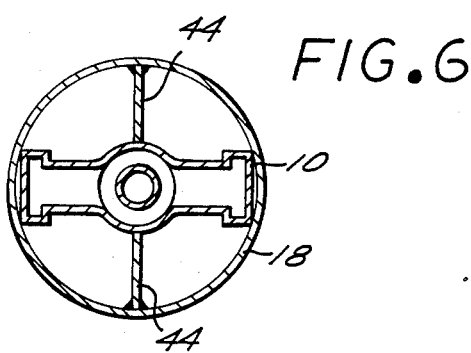
FIG. 6 is a cross-sectional view of the assembly shown on FIG. 3, the cross-section being taken on lines 6,6 of FIG. 3.

Separation of the surrounding pieces is easier in connection with many part configurations when ceramic separation walls 44 are provided in the can assembly. The ceramic separation walls 44 are shown on the cross-sectional view of FIG. 6.

Figure 5:
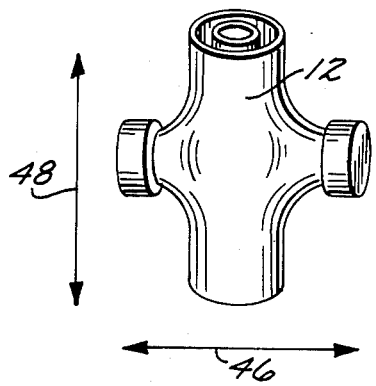
FIG. 5 is a perspective view of the consolidated object, after the object has been removed from the shell and the can.

It should be readily apparent from the foregoing description that the dimensions of the consolidated object 12, shown by way of example on FIG. 5, can be calculated and predicted substantially accurately on the basis of the considerations described above. Thus, the lateral dimension of the object 12, shown on FIG. 5 by the reference numeral 46, are substantially controlled by the corresponding lateral dimensions of the cavity of the shell 10. In this regard, there is virtually no, or only very little, shrinkage or distortion so that the lateral dimensions of the object 12 are "near net shape". Longitudinal dimensions 48 of the consolidated object 12 can be predicted from the above-described consideration, that shrinkage occurs to the extent of the compressibility of the powder 26. The final longitudinal dimensions 48 of the object 12 are also sufficiently accurate and not distorted relative to the expected configuration, so that, in the longitudinal direction also, the desired object 12 is near net shape.

The foregoing readily demonstrates that the present invention provides a useful, relatively rapid and relatively inexpensive process for near-net-shape manufacturing of objects of substantial complexity of configuration. Several modifications of the hereinabove-described process may become readily apparent to those skilled in the art in light of the present disclosure.

One particularly apparent modification is where a die cavity is used to serve as a container for the shell 10 and the powder 26 or 28 which surrounds the shell 10. In other words, in this modification a separate can is eliminated, because the shell 10 is placed into the suitable die cavity, and both the shell 10 as well as the space outside of the shell 10 is filled with the powders in accordance with the principles described above.

In light of the possibility for several modifications, the scope of the present invention should be interpreted solely from the following claims, as such claims are read in light of the disclosure.

What is claimed is:

1. A process for manufacturing objects by consolidation of powdered materials of the type capable of being consolidated in powder metallurgy processes, the process comprising the steps of:
    filling a shell with a first powder composition of the type capable of being consolidated in powder metallurgy processes, the first powder composition having a predetermined compressibility ratio, the shell being placed inside a can so that space is located between the shell and the can;
    filling the space between the shell and the can with a second powder composition of the type capable of being consolidated in powder metallurgy processes, the second powder composition having substantially the same compressibility ratio as the first powder composition;
    subjecting the can together with the shell included therein to elevated temperature and a pressure applied in one longitudinal direction only, the pressure and temperature being of sufficient magnitude to consolidate the first and second powder compositions, the shell being of a material which does not bond to the first powder composition, and
    disassembling the can and the shell which has been compacted in one direction as a result of the applied pressure to obtain an object consolidated from the first powder composition.

2. The process of claim 1 wherein the first and second powder compositions are identical compositions.

3. The process of claim 1 wherein the first and second powder compositions are different compositions.

4. The process of claim 1 wherein the shell is made of ceramic material.

5. The process of claim 1 further comprising the steps of degassing the can containing the first and second powder compositions, and thereafter sealing the can before consolidation.

6. The process of claim 1 wherein the step of subjecting the can to pressure is performed in a die and pressurization is accomplished by ramming action of a press.

7. The process of claim 1 wherein the step of subjecting the can to pressure is performed by placing the can into a cavity die and thereafter subjecting it to an impact force.

8. A process for manufacturing objects by consolidation of powdered materials of the type capable of being consolidated in powder metallurgy processes, the process comprising the steps of:
    placing a shell in a can so as to leave empty space between the can and the shell, the shell comprising a cavity;
    filling the cavity of the shell with a first powder composition of the type capable of being consolidated in powder metallurgy processes, the first powder composition having a compressibility ratio;
    filling the space between the can and the shell with a second powder composition of the type capable of being consolidated in powder metallurgy processes, the second powder composition having a compressibility ratio which is substantially identical with the compressibility ratio of the first powder composition;
    heating the can having the filled shell and the filled space therein to an elevated temperature sufficiently high to permit, when combined with application of pressure, substantially full consolidation of the first powder composition;
    subjecting the can having the filled shell and the filled space therein at the elevated temperature to a unidirectional pressure for a sufficiently long period of time to accomplish substantially full consolidation of the first powder composition, and
    disassembling the compacted can, the compacted shell, the consolidated first powder composition in the form of a substantially fully densified object, and the consolidated second powder composition in the form of scrap material or reworkable dense stock.

9. The process of claim 8 wherein the first powder composition is the same as the second powder composition.

10. The process of claim 9 wherein the first powder composition is selected from a group consisting of powders of metals, powders of metal alloys, ceramic powders, cermet powders, and mixtures of one or more of said powders of metals, metal alloys, ceramics and cermets.

11. The process of claim 10 wherein the second powder composition is selected from a group consisting of powders of metals, powders of metal alloys, ceramic powders, cermet powders, and mixtures of one or more of said powders of metals, metal alloys, ceramics and cermets.

12. The process of claim 8 further comprising a step of outgassing the can filled with the shell and the first and second powder compositions, the step of outgassing being performed before the step of subjecting to pressure.

13. The process of claim 12 further comprising the step of closing the can by welding after the step of outgassing and before the step of subjecting to pressure.

14. The process of claim 8 further comprising the step of preparing the shell from materials selected from ceramics, powders of metals, powders of metal alloys, powders of metalloids, carbon and mixtures of one or more of said ceramics, powders of metals, powders of metal alloys, powders of metalloids and carbon, the material of the shell being selected so as not to bond to the consolidated first powder composition.

15. A process of preparing near-net-shape powder metallurgy articles, the process comprising the steps of:
    placing a shell in a can, the shell defining an interior cavity, and the assembled shell and can defining spaces within the can between the shell and the can;
    filling the interior cavity of the shell with a first powder composition selected from a group consisting of powders of metals, powders of metal alloys, ceramic powders, cermet powders, and mixtures of one or more of said powders of metals, powders of metal alloys, ceramic powders, and cermet powders;
    filling the spaces between the shell and can with a second powder composition selected from a group consisting of powders of metals, powders of metal alloys, ceramic powders and mixtures of one or more of said powders of metals, powders of metal alloys, ceramic powders, and cermet powders, the first and second powder compositions having substantially identical compressibility ratios, compressibility ratio being defined as the ratio of the apparent density of the powder to the density of the consolidated article prepared in the process from the respective powder composition;

heating the assembled can and shell having the first and second powder compositions to a consolidating temperature;

applying unidirectional pressure to the assembled can and shell having the first and second powder compositions, the pressure being of sufficient magnitude and being applied for sufficient time at said consolidating temperature to obtain substantially full consolidation of the first powder composition to provide the near-net-shape article, dimensions of the consolidated article being substantially identical in the direction perpendicular to the applied pressure to the dimensions of the interior cavity of the shell, whereas dimensions of the consolidated article in the direction of the applied pressure being defined by the dimensions of the interior cavity and by the compressibility ratios of the first and second powder compositions, and disassembling the compacted can, the compacted shell, the consolidated first powder composition in the form of the consolidated article, and the consolidated second powder composition in the form of scrap material or reworkable densified stock.

16. The process of claim 15 wherein the first and second powder compositions are substantially identical.

17. The process of claim 15 further comprising the step of outgassing the can in vacuum before the step of subjecting to pressure.

18. The process of claim 17 further comprising the step of sealing the can by welding after the step of outgassing and before the step of subjecting to pressure.

19. The process of claim 15 wherein the step of subjecting to pressure comprises placing the assembled can into the cavity of a die and subjecting the assembled can to the action of a press punch.

20. The process of claim 15 further comprising the step of placing in the space between the shell and the can at least one separation wall whereby at least two scrap pieces of the consolidated second powder composition are obtained after the step of disassembling.

21. A process for manufacturing objects by consolidation of powdered materials of the type capable of being consolidated in powder metallurgy processes, the process comprising the steps of:

filling a shell with a first powder composition of the type capable of being consolidated in powder metallurgy processes, the first powder composition having a predetermined compressibility ratio, the shell being placed inside the cavity of a die so that space is located between the shell and interior wall of the die defining the cavity;

filling the space between the shell and the interior walls of the die with a second powder composition of the type capable of being consolidated in powder metallurgy processes, the second powder composition having substantially the same compressibility ratio as the first powder composition;

subjecting the first and second powder compositions to elevated temperature and mechanical pressure applied in one longitudinal direction only, the pressure and temperature being of sufficient magnitude to consolidate the first and second powder compositions, the shell being of a material which does not bond to the first powder composition, and removing the shell which has been compacted in one direction as a result of the applied pressure, to obtain an object consolidated from the first powder composition.

22. The process of claim 21 wherein the first and second powder compositions are identical compositions.

23. The process of claim 21 wherein the first and second powder compositions are different compositions.

24. The process of claim 21 wherein the shell is made of a ceramic material.

25. The process of claim 21 wherein the steps of subjecting to pressure is performed by the ramming action of a press in the die cavity.

26. The process of claim 21 wherein the step of subjecting to pressure is performed by subjecting the shell and the powder compositions to an impact force.

* * * * *

UNITED STATES PATENT AND TRADEMARK OFFICE
CERTIFICATE OF CORRECTION

PATENT NO. : 4,673,549

DATED : June 16, 1987

INVENTOR(S) : GUNES ECER

It is certified that error appears in the above-identified patent and that said Letters Patent is hereby corrected as shown below:

Cover page, in the drawings, delete the word "POWER" and insert --POWDER-- all occurrences.

Sheet 1 of 2 of the drawings in Figure 1, delete the word "POWER" and insert --POWDER-- all occurrences.

Sheet 2 of 2 of the drawings in Figure 5, top of the object should be solid with a hole in the center.

Signed and Sealed this

Twelfth Day of July, 1988

Attest:

DONALD J. QUIGG

Attesting Officer     Commissioner of Patents and Trademarks